US005177345A

United States Patent [19]

Baitz

[11] Patent Number: 5,177,345

[45] Date of Patent: Jan. 5, 1993

[54] MERCHANDISE SCANNER FOR RETAIL STORES

[75] Inventor: Günter Baitz, Berlin, Fed. Rep. of Germany

[73] Assignee: Siemens Nixdorf Informationssysteme AG, Paderborn, Fed. Rep. of Germany

[21] Appl. No.: 664,914

[22] Filed: Mar. 5, 1991

[30] Foreign Application Priority Data

Mar. 7, 1990 [DE] Fed. Rep. of Germany ....... 4007219

[51] Int. Cl.[5] ............................................. G06K 7/01

[52] U.S. Cl. .................................. 235/462; 235/383; 235/472

[58] Field of Search ....................... 235/472, 383, 462; 364/466; 177/4, 25

[56] References Cited

U.S. PATENT DOCUMENTS

| | | | |
|---|---|---|---|
| 4,398,253 | 8/1983 | Karp | 235/383 |
| 4,988,851 | 1/1991 | Kohno et al. | 235/383 |
| 5,059,951 | 10/1991 | Kaltmer | 235/383 |

*Primary Examiner*—Harold Pitts

*Attorney, Agent, or Firm*—Dykema Gossett

[57] ABSTRACT

A merchandise scanner for retail stores includes a horizontal conveyor for transporting merchandise, a scanning window facing an area above the conveyor and an operator console with control elements positioned along side the conveyor and at right angles to the direction of merchandise transport, wherein the conveyor is vertically movable. The scanning window of a scanning device is also vertically movable, either together with or independently of the conveyor so that it can be adjusted in accordance with the size and weight of the merchandise as well as the position of bar codes on the merchandise.

10 Claims, 2 Drawing Sheets

MERCHANDISE SCANNER FOR RETAIL STORES

TECHNICAL FIELD

The invention relates to a merchandise scanner for retail stores according to the general concept in Patent claim 1.

BACKGROUND ART

Merchandise scanners have been proposed in which all merchandise, goods or objects are placed on the conveyor and guided past a scanning window for scanning so that the bar code can be scanned by a scanning element. However this procedure is problematic, particularly with regard to bulky and/or heavy objects which must be lifted by the user, i.e. the cashier or the customer onto the conveyor. Depending on the weight of the object, this procedure requires a great amount of strength and can cause internal injuries to the user. Certain groups of users may not even be able to lift certain objects onto the conveyor.

SUMMARY OF THE INVENTION

The present invention is based on the goal of creating a merchandise scanner of the type mentioned above which improves the scanning of merchandise, particularly of bulky and/or heavy objects.

According to the invention, this goal is achieved by a merchandise scanner which includes a conveyor which can be moved vertically.

With the aid of the vertically adjustable conveyor, the latter can be moved to the precise level of the object in question so that the object can be simply pushed onto the conveyor. The height of the conveyor can then be moved to the level of the transport mechanism. This effectively prevents injuries to the user such as pulled ligaments or fractures.

The scanning window should be placed next to the conveyor in an upright position and parallel to the direction of merchandise transport. In goods of the type mentioned above, the bar code is often located on a side surface, so that the goods can be simply placed on the conveyor in order to scan their bar codes without requiring a great deal of effort in turning the goods around a horizontal axis, as is the case when the scanning window is installed in the conveyor. According to this version, the goods can be easily rotated around a vertical axis, depending on where the bar code is positioned, so that the bar code is facing the scanning window. Since the goods do not have to be placed on their sides, this design makes it possible to process the goods more quickly. Since the operator console is, in any case, positioned alongside the conveyor, the scanning window should be placed on the side of the operator console near the conveyor. In this case, the scanning window can placed in brackets already provided for the operator console, thereby performing the dual function of holding in place the operator console and the scanning window. This arrangement protects the scanning window even when the merchandise scanner is in operation, so that the window is less easily damaged.

According to another version of the merchandise scanner, the scanning window can be adjusted vertically along with the conveyor. As a result, the scanning window is always positioned at a proper distance from the conveyor and thus from the lower edge of the goods to be scanned. When the conveyor is moved, the scanning window is automatically moved along with it. Therefore, the user does not need to worry whether the scanning window is at the correct height for scanning the goods. As a result, the user can easily unload a shopping cart loaded in several layers and always set the optimum conveyor height, i.e. the height adjusted to the appropriate level.

It should be possible to move the scanning window vertically relative to the conveyor. According to this version, it is possible to precisely match the arrangement of the scanning window and conveyor to various goods. For example, it may be necessary, particularly with regard to large, heavy goods, to position the conveyor near the floor and the scanning window away from the floor, because the bar code to be scanned is positioned more or less in the vertical center or near the top edge of the object. According to this version of the merchandise scanner, bar codes positioned at a remote distance can be scanned by machine, thereby eliminating the need for laborious and time-consuming data entry, e.g. via an input keyboard. However, even small objects can be easily scanned with the merchandise scanner. For this purpose, the user can move the conveyor to its top position so that such objects can be scanned with the scanning window near the conveyor and the user in an upright, ergonomical position.

A hand-operated scanning device which can be moved to the conveyor area may be provided. This type of scanning device, called a hand scanner, can be used to scan particularly bulky or heavy objects on their respective means of transport, such as a shopping cart, without having to place these goods on the conveyor. In addition, this type of scanning device can be used to automatically scan the bar codes of objects placed on the conveyor if these bar codes are positioned in hard-to-reach locations. As a result, it is not necessary to turn the object. According to this version, the goods can be recorded or scanned by machine, and therefore efficiently, even under extreme conditions.

It is also advantageous to place a VDU with screen on the top of a column holding the operator console. This makes it possible to position the operator console and screen in a manner favorable to the user so that the merchandise data can be ergonomically entered and the information displayed on the screen easily viewed and read. The operator console and screen can thus be placed in a position advantageous for the user, regardless of the position of the conveyor.

One of the control elements should be designed as an input and/or control keyboard so that the merchandise can be recorded by hand if the bar code is missing or damaged, or if automatic scanning of the bar code will produce incorrect results for other reasons. For example, the keyboard can be used to change or set the position of the merchandise scanning surface or the scanning window. These control elements should be incorporated into the operator console positioned on the top of the column holding the VDU; however, they can also be mounted in any other position alongside the conveyor and at right angles to the direction of merchandise transport.

According to another version of the invention, the input and/or control keyboard and the VDU are placed in a row at right angles to the direction of merchandise transport. This arrangement also makes it possible to quickly check the data entered or scanned via the input keyboard or scanning device. Since the user preferably stands in front of the scanning window when operating the merchandise scanner, he can check the scanned data merely by looking at the screen, without turning his head.

Moreover, one of the output openings should be designed as an output compartment for a receipt, i.e. merchandise record or a cash register tape, since this output compartment is already in the user's line of vision and the receipt can easily be removed at the end of the scanning process. In addition, the receipt in the compartment is largely protected against unintentional tearing or damage. This type of merchandise scanner can also be easily installed in a conveyor system, since control elements and/or input/output openings are not provided in the side or back walls of such equipment.

BRIEF DESCRIPTION OF THE DRAWINGS

Versions of the object of the invention are described in greater detail below on the basis of the accompanying drawings.

DETAILED DESCRIPTION OF THE PREFERRED EMBODIMENT

Figure 1:
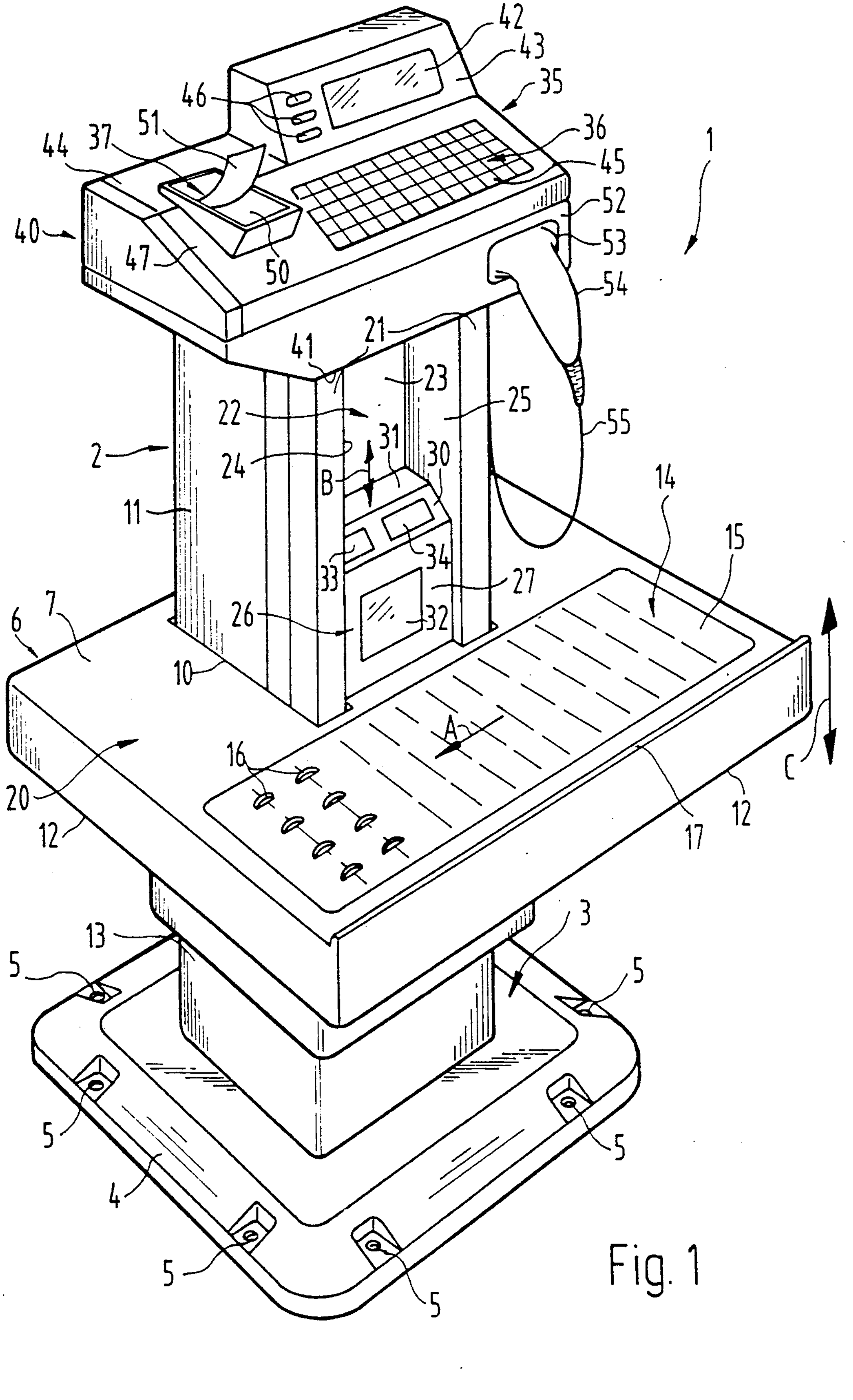
FIG. 1 shows a schematic view in perspective of a merchandise scanner for retail stores according to a first version.

FIG. 1 shows a schematic illustration in perspective of a merchandise scanner (1). The merchandise scanner (1) has a column (2), the lower end (3) of which is firmly attached via a base (4) to a floor (not illustrated in greater detail) with the aid of fastening bolts (5). According to FIG. 1, the column (2) is a more or less square shape.

The column (2) has a counter (6) with a horizontal top surface (7). The counter (6) has an opening (10) more or less equivalent to the cross section of the column (2) through which the column (2) passes so that the counter (6) divides the column (2) into a top part (11) positioned above the top surface (7) of the counter (6) and a bottom part (13) positioned beneath the underside (12) of the counter (6). According to FIG. 1, therefore, the column (2) is completely surrounded by the counter (6).

A horizontal conveyor (14) forming a means of transport is installed in the top surface (7) of the counter (6) so that the top (15) of the conveyor (14) lies more or less flush against the top surface (7) of the counter (6). A roller path (16), which is schematically illustrated as an example on the left side of the counter (6) in FIG. 1, is inserted into the top (15) of the counter (6). However, it is also possible to provide a chain conveyor or conveyor belt in place of the roller path (16). The roller conveyor (16) allows the goods, merchandise or objects to be scanned to be gently pushed in the direction of merchandise transport, i.e. along the conveyor (14). Spheres placed in the top (15) of the conveyor (14), which also allow the goods to be pushed across the direction of transport or turned around a vertical axis, can be provided in place of the roller path (16).

According to FIG. 1, the conveyor (14) nearly extends along the entire length of the counter (6) and has a width equivalent to approximately 40% of the entire counter width, starting in the region near the front edge (17) of the counter (6). However, it is also possible to design the width of the conveyor (14) so that it is greater or less than the above-mentioned value. As a result, the conveyor (14) runs near and parallel to the front edge (17) of the counter (6), so that the opening (10) and the column (2) are positioned in the rear part of the counter (20). The opening (10), and thus the column (2), are positioned centrally in relation to the longitudinal axis running parallel to the direction of transport and arranged asymmetrically in the counter (6) at right angles to direction of transport.

A groove-like recess (22) with a rear wall (23) extending parallel to the direction of transport (see Arrow A) and side walls (24), (25) running at right angles to the direction of transport are provided in the front wall (21) of the column (2). A housing (26) with little clearance toward the rear wall (23) and the side walls (24), (25) is fitted into the recess (22); this housing has a front wall (27) facing a region above the conveyor (14), a diagonal wall (30) joined at the top of the front wall in FIG. 1 and a horizontal top (31) connected to the diagonal wall. The front wall (27) contains a scanning window (32), behind which lies a scanning device (not illustrated). Two parallel signal lamps (33), (34) of different colors are inserted into the wall (30), each of which indicates whether a scanning operation was carried out properly or with errors.

The scanning window (32) is thus placed next to the conveyor (14) in an upright position and parallel to the direction of transport (see Arrow A). Due to the above-mentioned clearance between the side walls and the rear wall of the housing (26) and the groove-like recess (22), the scanning window (32) can be moved vertically together with the housing (26) in the recess with the aid of a drive which is not illustrated in greater detail (see Arrow B). The conveyor (14) can also be moved vertically with the counter (6) along the column (2) by means of a drive which is not illustrated in greater detail (see Arrow C); the upward and downward movement of the scanning window (32) can be coupled with the upward and downward movement of the counter (6) so that the scanning window (32) is adjustable in height along with the conveyor (14). In addition, the merchandise scanner (1) can be designed so that the scanning window (32) can be moved vertically relative to the conveyor (14), i.e. independently of the sliding motion of the counter (6).

An operator console (35) with control elements (36) and an output opening (37) is positioned on a platform (40) on the top surface (41) of the column (2) alongside of the conveyor (14) and at right angles to the direction of transport. In addition to the control elements (36) and the output opening (37), the platform (40) also holds a VDU (43) with screen (42) connected to the platform (40) directly or via a support (not illustrated). According to FIG. 1, the VDU (43) is connected to the top (44) of the platform (40) to form a single unit.

As shown in FIG. 1, one of the control elements (36) is designed as an input keyboard (45) and as a control keyboard (46), with the input keyboard (45) mounted on a diagonal front wall (47) of the platform (40) and the control keyboard (46) positioned next to the screen (42) of the VDU (43). However, it is also possible to design part of the control element (36) in the front wall (47) as a control keyboard (46). The input and control keyboard (45) and (46) and the VDU (43) are then positioned in a row at right angles to the direction of transport (see Arrow A).

According to the version illustrated, the output opening (37) is an output compartment (50) for a receipt or cash register tape (51). A receipt printer, which is not illustrated in greater detail. is mounted on the platform (40) and prints the merchandise data or information recorded with the aid of the scanning device on the receipt (51). The output compartment (50) can be recessed so that the receipt (51) does not project over the edge of the output compartment. In addition, the output compartment can be closed with a flip-up lid (not illustrated). According to the version in FIG. 1, the output opening (37) is placed to the left of the input keyboard (45) and lies partially in the top (44) and partially in the front wall (47) of the platform (40).

The platform (40) also has a vertical front wall (52) which has a recess (53) beneath the input keyboard (45) for storing a hand-operated scanning device (54). The scanning device (54) is connected to the platform (40) via a cord (55). However, the cord (55) can also be connected to the column (2) or counter (6) and thus electrically connected to the control electronics (not illustrated). The cord (55) has a sufficient length or is made of elastic material so that the scanning device (54) can be moved to the region of the conveyor (14) or the region of the goods placed near the conveyor.

Figure 2:
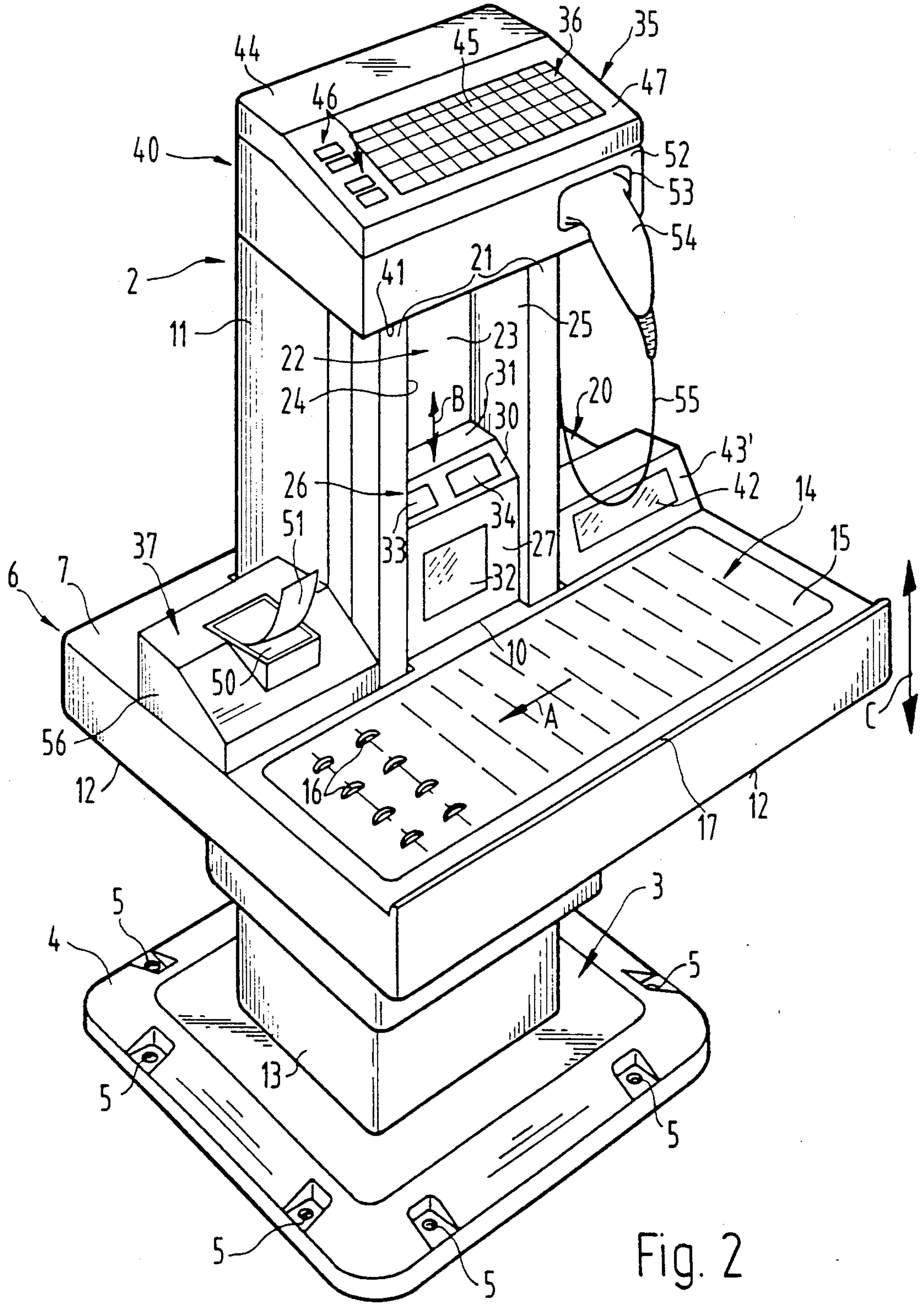
FIG. 2 shows a schematic view in perspective of a merchandise scanner for retail stores according to a second version.

FIG. 2 shows a second version of the merchandise scanner. In this figure, the same parts are marked with the same reference numbers used for the first version in FIG. 1.

According to this version, the VDU (43) is located to the right of the column (2) and a receipt printer (56) to the left of the column (2) on the top surface (7) of the counter (6). The receipt printer (56) has an output compartment (50) designed as an output opening (37) for the receipt (51). According to this version, the control keyboard (46) is to the left of the input keyboard (45) in the front wall (47) of the platform (40). It is clear that the VDU (43') and receipt printer (56) in this version are move up and down together with the counter (6) in the direction of Arrow C.

The receipt printer (56) is provided with a cutter (not illustrated in greater detail) next to the output compartment (50) which cuts the printed part of the receipt (51) from the unprinted part of the paper roll. The control elements (36) can also have an intercom system and an input opening, e.g. for a card reader. All control elements (36) are connected to a computer which is not illustrated. The card reader can be used, for example, to read credit and customer charge cards for noncash payments. In addition, the input keyboard (45) can be used to manually enter a personal code assigned to the above-mentioned cards or the bar code attached to the merchandise. With the aid of the control keyboard (46), the counter (6) and the housing (26) with the scanning window (32) can be moved vertically, either together or independently. The control keyboard can also be used to signal operations to the computer such as the end of a scanning process or to page a supervisor. In the versions described above, the separate input keyboard can be omitted if it is integrated into part of the screen (42). In this case, at least part of the screen has a touch-sensitive, transparent coating. Such devices are generally known as touch screens or touch displays.

Operation of the merchandise scanner is described below on the basis of examples.

The user, for example a customer in a retail store, places his shopping cart laden with merchandise at the counter (6) of the merchandise scanner (1), for example from the right; by operating the control keyboard (46), he then moves the height of the top surface (7) of the counter (6) to the level of the individual goods in the cart, so that bulky and/or heavy goods in particular do not have to be lifted onto the conveyor (14) but can be simply pushed onto it. The goods are now on the conveyor (14) are moved past the scanning window (32) in the direction of transport (see Arrow A) so that the bar codes are scanned by the scanning device behind the window and the information on the goods can be displayed on the screen (42) of the VDU (43) or (43') and/or transmitted to a computer. If goods are particularly bulky or heavy, the bar codes should be attached to the side surfaces which must then by turned toward the scanning window (32). If it is too difficult or laborious to turn the goods, or if the bar codes are in a hard-to-reach location, the information or data in the bar code can also be recorded by the hand-operated scanning device (54) and processed by the control device. For goods with missing or merely damaged bar codes, the information on the goods can be entered to the merchandise scanner (1) via the input keyboard (45).

The receipt printer prints the bar-code data, such as type of goods and price, on the receipt (51), which is then removed from the roll of paper in the printer each time the merchandise data is printed on the receipt. The receipt (51) then gradually passes into the output compartment (50). At the end of the scanning process, the receipt (51) is cut off from the roll of paper and can be removed from the output compartment (50).

The goods, which are travel on the conveyor (14) past the scanning window, can be placed, for example, in a shopping cart (not illustrated) to the left of the merchandise scanner. The customer then pays the amount printed on the receipt and displayed on the VDU, either by inserting a charge or credit card into the card reader (not displayed) or by placing cash in the cash input/output openings which can be located on the operator console (35). Naturally, it is also possible to pay the receipt at a separate cash register. If problems occur in scanning the merchandise, the customer can page a supervisor, for example by using the control keyboard (46).

The customer will also try to adjust the top surface (7) of the counter (6) to the level of the goods to be scanned. Depending on the location of the bar codes, the housing (26) with the scanning window (32) can be moved vertically, i.e. upwards or downwards, in addition to the conveyor (14). For large and particularly heavy goods, such as those on a pallet, the user will therefore move the counter (6) as close to the floor as possible. The scanning window (32) is then adjusted so that the bar codes can be scanned by the scanning device. Since the scanning device permits a certain range of scatter, the scanning window (32) does not have to be positioned at exactly the same level as the bar code. The operator console (35) is positioned above the scanning window and conveyor, so that the user can operate the controls on it while standing in a position or posture that is ergonomical for him. This considerably simplifies the scanning of bulky and/or heavy objects.

I claim:

1. A merchandise scanner for retail stores, comprising:

an essentially horizontal conveyor for transporting merchandise along a path past an operator station;

a scanning window at the operator station facing an area above the conveyor;

an operator console at the operator station with control elements positioned alongside the conveyor and at right angles to the path of merchandise transport.

wherein the conveyor is vertically movable. and the conveyor, scanning window and operator console are substantially vertically aligned at the operator station.

2. The merchandise scanner according to claim 1, wherein the scanning window is vertically movable along with the conveyor.

3. The merchandise scanner according to claim 1, the scanning window is vertically movable relative to the conveyor.

4. The merchandise scanner according to claim 1, including a hand-operated scanning device movable to the area of the conveyor.

5. The merchandise scanning according to claim 1, wherein one of the control elements includes a keyboard.

6. The merchandise scanner according to claim 1, including a platform having a video display unit with a screen, said platform being positioned on the top surface of a column holding the operator console.

7. The merchandise scanner according to claim 5, wherein the keyboard and the VDU are positioned in a row at right angles to the direction of the transport of the merchandise.

8. The merchandise scanner according to claim 6, wherein the platform has an output opening which is an output compartment for a receipt.

9. The merchandise scanner according to claim 1, wherein the conveyor is positioned on a vertically adjustable counter which also includes a receipt printer.

10. The merchandise scanner according to claim 1, wherein the conveyor is positioned on a vertically adjustable counter which also includes a video display unit.

* * * * *